United States Patent
Zhou et al.

(10) Patent No.: US 8,102,631 B2
(45) Date of Patent: Jan. 24, 2012

(54) COMPUTER POWER SUPPLY AND STANDBY VOLTAGE DISCHARGE CIRCUIT THEREOF

(75) Inventors: Hai-Qing Zhou, Shenzhen (CN); Chung-Chi Huang, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 332 days.

(21) Appl. No.: 12/468,016

(22) Filed: May 18, 2009

(65) Prior Publication Data

US 2010/0277146 A1 Nov. 4, 2010

(30) Foreign Application Priority Data

Apr. 29, 2009 (CN) .......................... 2009 1 0301975

(51) Int. Cl.
*H02H 9/00* (2006.01)
*H02H 3/24* (2006.01)
*G11C 5/14* (2006.01)

(52) U.S. Cl. .............................. 361/54; 361/92; 365/229

(58) Field of Classification Search .................... 361/54, 361/92; 365/229
See application file for complete search history.

(56) References Cited

U.S. PATENT DOCUMENTS

| | | | | | |
|---|---|---|---|---|---|
| 4,023,089 | A | * | 5/1977 | Arakane | 322/28 |
| 4,449,177 | A | * | 5/1984 | Kozai et al. | 363/126 |
| 4,590,415 | A | * | 5/1986 | Iwaki et al. | 320/123 |
| 4,893,564 | A | * | 1/1990 | Ochi et al. | 102/218 |
| 6,775,784 | B1 | * | 8/2004 | Park | 713/320 |
| 6,816,428 | B2 | * | 11/2004 | Zimmermann et al. | 365/226 |
| 7,200,015 | B1 | * | 4/2007 | Mirskiy | 363/47 |

FOREIGN PATENT DOCUMENTS

JP 02303315 A * 12/1990

* cited by examiner

*Primary Examiner* — Jared Fureman
*Assistant Examiner* — Scott Bauer
(74) *Attorney, Agent, or Firm* — Altis Law Group, Inc.

(57) ABSTRACT

A computer power supply includes a standby voltage output terminal to output a standby voltage, a power connector connected to the standby voltage output terminal, and a standby voltage discharge circuit including a zener diode, first and second electrical switches. The standby voltage output terminal is connected to a cathode of the diode. An anode of the diode is connected to a first terminal of the first electrical switch. A second terminal of the first electrical switch is grounded. A third terminal of the first electrical switch is connected to a first terminal of the second electrical switch and the standby voltage output terminal via a first resistor. A second terminal of the second electrical switch is grounded. A third terminal of the second electrical switch is connected to the standby voltage output terminal via a second resistor. A capacitor is connected between the standby voltage output terminal and ground.

10 Claims, 1 Drawing Sheet

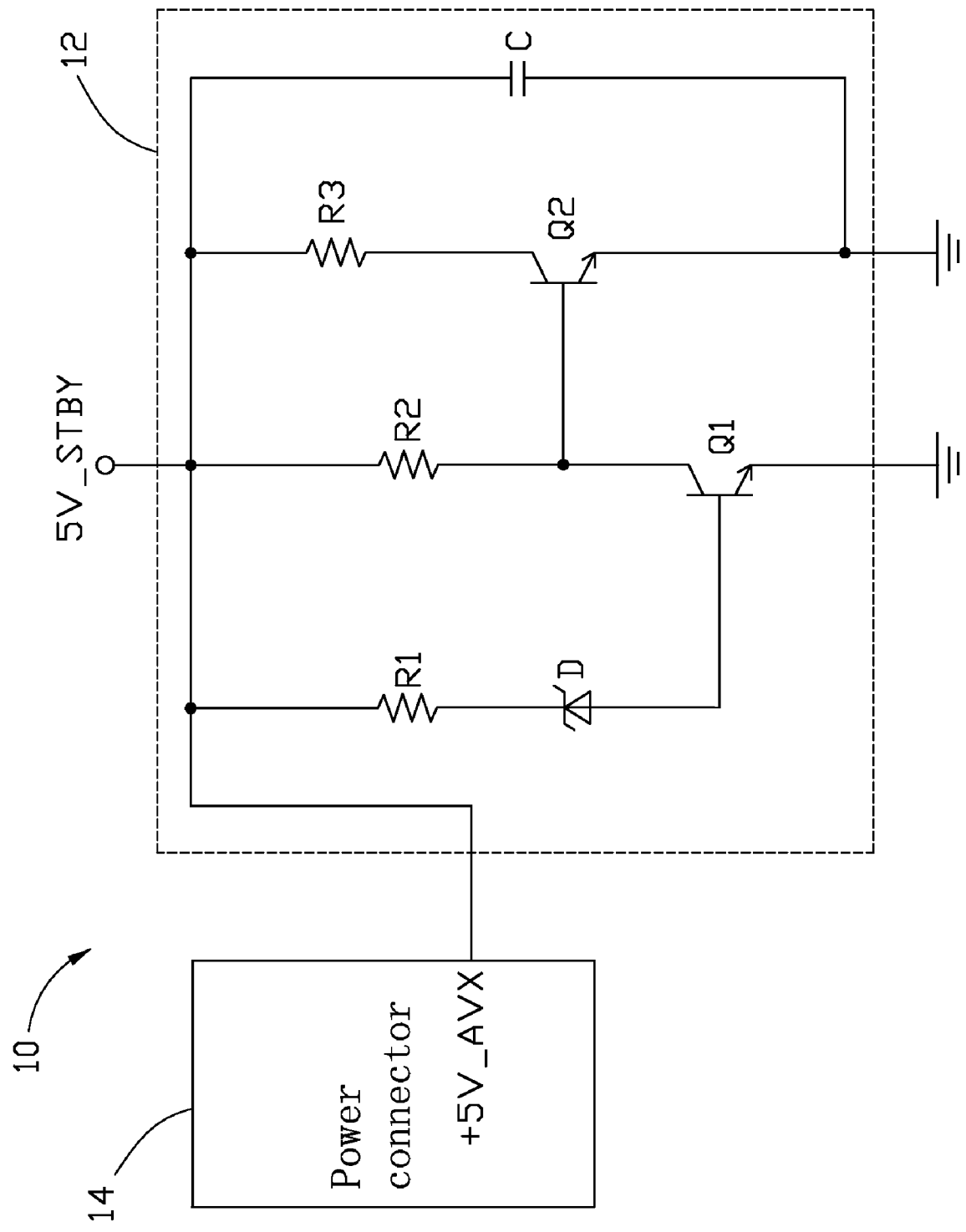

COMPUTER POWER SUPPLY AND STANDBY VOLTAGE DISCHARGE CIRCUIT THEREOF

BACKGROUND

1. Technical Field

The present disclosure relates to computer power supplies and, particularly, to a computer power supply with a standby voltage discharge circuit.

2. Description of Related Art

Before motherboards are sold, they should undergo several tests. An alternating current (AC) power on/off test is one of such tests. In detail, a motherboard is automatically and repeatedly powered on and off using an external AC power supply (such as 110V) that is connected to a computer power supply for the motherboard. However, if the switching time between the AC power supply being powered on and off is very short, the motherboard may not boot up normally because a standby voltage of the computer power supply may take longer than the switching time to discharge. In which case the motherboard detects an abnormal status when the AC power supply is powered off.

BRIEF DESCRIPTION OF THE DRAWINGS

The drawing is a circuit diagram of an exemplary embodiment of a computer power supply.

DETAILED DESCRIPTION

Referring to the drawing, an exemplary embodiment of a computer power supply 10 is used to supply power to a computer motherboard (not shown). The computer power supply 10 includes a standby voltage output terminal 5V_STBY, a standby voltage discharge circuit 12, and a power connector 14 for connecting to the computer motherboard. The standby voltage output terminal 5V_STBY is to output a 5V standby voltage from a standby voltage generating circuit (not shown) to a standby voltage output pin +5V_AVX of the power connector 14 and the standby voltage discharge circuit 12. The standby voltage discharge circuit 12 is to rapidly discharge the 5V standby voltage. The standby voltage generating circuit is a known circuit, and therefore is not described here.

The standby voltage discharge circuit 12 includes three resistors R1-R3, a zener diode D, a capacitor C, and two transistors Q1 and Q2 as electrical switches.

A first terminal of the resistor R1 is connected to the standby voltage output terminal 5V_STBY and the standby voltage output pin +5V_AVX of the power connector 14. A second terminal of the resistor R2 is connected to a cathode of the diode D. An anode of the diode D is connected to a base as a first terminal of the transistor Q1. An emitter as a second terminal of the transistor Q1 is grounded. A collector as a third terminal of the transistor Q1 is connected to a first terminal of the resistor R2 and a base as a first terminal of the transistor Q2. A second terminal of the resistor R2 is connected to the standby voltage output terminal 5V_STBY. An emitter as a second terminal of the transistor Q2 is grounded. A collector as a third terminal of the transistor Q2 is connected to the standby voltage output terminal 5V_STBY via the resistor R3. The capacitor C is connected between the standby voltage output terminal 5V_STBY and ground for receiving the 5V standby voltage when the 5V standby voltage is discharged.

In one embodiment, a breakdown voltage of the diode D is about 3.6V, and can be adjusted according to requirements. In other embodiments, the transistors Q1 and Q2 can be replaced by other types of electrical switches, such as relays or field-effect transistors (FET). The resistor R1 can be omitted for saving costs.

In use, when the standby voltage output terminal 5V_STBY outputs the 5V standby voltage, the diode D is turned on. Therefore, the transistor Q1 is turned on and the transistor Q2 is turned off. At this time, the standby voltage discharge circuit 12 performs no function for the computer power supply 10.

When an external alternating current (AC) power supply (not shown) connected to the computer power supply 10 is switched off, the 5V standby voltage of the standby voltage output terminal 5V_STBY begins to be discharged via the capacitor C. When the 5V standby voltage of the standby voltage output terminal 5V_STBY is discharged to a predetermined value such as 4.3V, the diode D is turned off. Thereby, the transistor Q1 is turned off and the transistor Q2 is turned on, such that the 5V standby voltage of the standby voltage output terminal 5V_STBY is rapidly discharged via the resistor R3 and the transistor Q2.

When the computer motherboard undergoes an alternating current (AC) power on/off test, the motherboard will be booted up normally anytime, provided no other problems exist, because the 5V standby voltage of the computer power supply 10 is discharged very quickly via the standby voltage discharge circuit 12.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A computer power supply, comprising:
   a standby voltage output terminal to output a standby voltage;
   a power connector comprising a standby voltage output pin that is connected to the standby voltage output terminal; and
   a standby voltage discharge circuit, comprising:
      a zener diode;
      a capacitor;
      a first electrical switch; and
      a second electrical switch;
   wherein, the standby voltage output pin of the power connector is connected to a cathode of the zener diode, an anode of the zener diode is connected to a first terminal of the first electrical switch, a second terminal of the first electrical switch is grounded, a third terminal of the first electrical switch is connected to a first terminal of the second electrical switch and connected to the standby voltage output terminal via a first resistor, a second terminal of the second electrical switch is grounded, a third terminal of the second electrical switch is connected to the standby voltage output terminal via a second resistor, the capacitor is connected between the standby voltage output terminal and ground, each of the first and second electrical switches is turned on in response to the first terminal thereof is at a high voltage level, and each of the first and second electrical switches is turned off in response to the first terminal thereof is at a low voltage level;
   wherein when the computer power supply is powered, the zener diode is turned on to turn on the first electrical switch and turn off the second electrical switch; when the computer power supply is not powered and the standby voltage is reduced to a predetermined value, the zener diode is turned off to turn off the first electrical switch and turn on the second electrical switch, such that the standby voltage is reduced by discharging through the second electrical switch.

2. The computer power supply of claim 1, wherein the standby voltage discharge circuit further comprises a third resistor connected between the zener diode and the standby voltage output pin of the power connector.

3. The computer power supply of claim 1, wherein each of the first and second electrical switches is a transistor, the first to third terminals of each of the first and second electrical switches are corresponding to a base, an emitter, and a collector of the transistor.

4. The computer power supply of claim 1, wherein a breakdown voltage of the zener diode is about 3.6 volts.

5. The computer power supply of claim 1, wherein the standby voltage is 5 volts.

6. A standby voltage discharge circuit to discharge a standby voltage of a computer power supply, the standby voltage discharge circuit comprising:
a zener diode;
a capacitor;
a first electrical switch; and
a second electrical switch;
wherein, a cathode of the zener diode is to receive the standby voltage, an anode of the zener diode is connected to a first terminal of the first electrical switch, a second terminal of the first electrical switch is grounded, a third terminal of the first electrical switch is connected to a first terminal of the second electrical switch and to receive the standby voltage via a first resistor, a second terminal of the second electrical switch is grounded, a third terminal of the second electrical switch is to receive the standby voltage via a second resistor, the capacitor is connected between the standby voltage and ground, wherein each of the first and second electrical switches is turned on in response to the first terminal thereof is at a high voltage level, and each of the first and second electrical switches is turned off in response to the first terminal thereof is at a low voltage level;
wherein when the computer power supply is powered, the zener diode is turned on to turn on the first electrical switch and turn off the second electrical switch; when the computer power supply is not powered and the standby voltage is reduced to a predetermined value, the zener diode is turned off to turn off the first electrical switch and turn on the second electrical switch, such that the standby voltage is reduced by discharging through the second electrical switch.

7. The standby voltage discharge circuit of claim 6, further comprising a third resistor connected between the standby voltage and the zener diode.

8. The standby voltage discharge circuit of claim 6, wherein each of the first and second electrical switches is a transistor, the first to third terminals of each of the first and second electrical switches are corresponding to a base, an emitter, and a collector of the transistor.

9. The standby voltage discharge circuit of claim 6, wherein a breakdown voltage of the zener diode is about 3.6 volts.

10. The standby voltage discharge circuit of claim 6, wherein the standby voltage is 5 volts.

* * * * *